(No Model.)
O. W. GOSLEE.
FIELD MARKER.
No. 416,595. Patented Dec. 3, 1889.
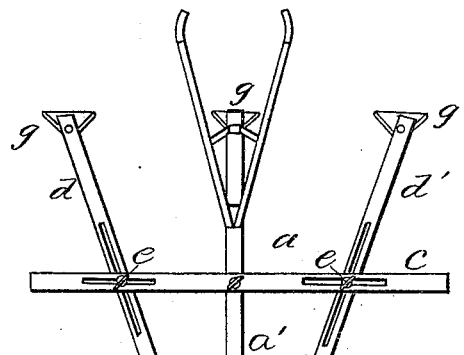
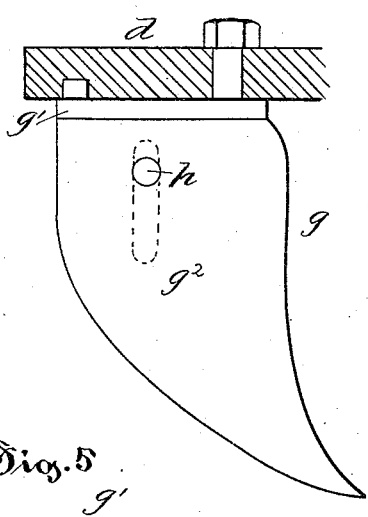
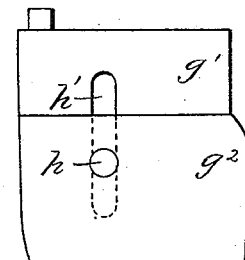
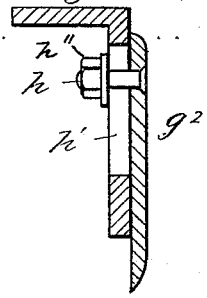
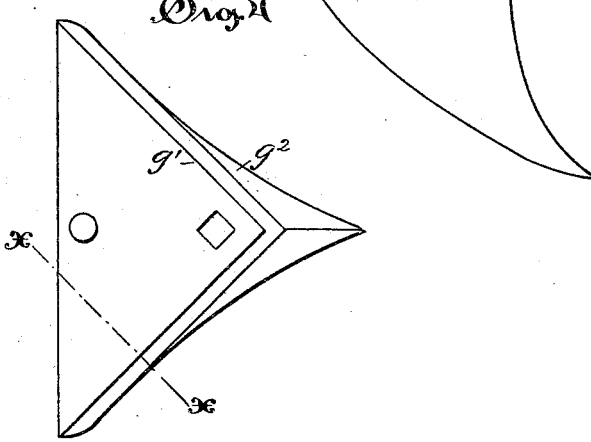
Witnesses:
Harry R. Williams
A. B. Jenkins
Inventor,
Ozias W. Goslee
by Simonds & Burdett,
attys.

UNITED STATES PATENT OFFICE.

OZIAS W. GOSLEE, OF GLASTONBURY, CONNECTICUT.

FIELD-MARKER.

SPECIFICATION forming part of Letters Patent No. 416,595, dated December 3, 1889.

Application filed September 5, 1889. Serial No. 323,077. (No model.)

*To all whom it may concern:*

Be it known that I, OZIAS W. GOSLEE, of Glastonbury, in the county of Hartford and State of Connecticut, have invented certain new and useful Improvements in Field-Markers, of which the following is a full, clear, and exact description, whereby any one skilled in the art can make and use the same.

The object of my invention is to provide an agricultural implement for use in marking out rows of any desired width for any crop that is usually planted in rows, and also one that is usable by tobacco-growers for laying out and marking rows for setting out the plants.

To this end my invention consists in the combination of a frame and the several other parts making up the instrument as a whole, as more particularly hereinafter described, and pointed out in the claims.

Referring to the drawings, Figure 1 is a top or plan view of a marker embodying my invention. Fig. 2 is a detail side view, on enlarged scale, of one of the marker-teeth. Fig. 3 is a like detail view showing the marker-tooth extended. Fig. 4 is a detail top view of one of the marker-teeth. Fig. 5 is a detail view in cross-section of a tooth on plane $x\,x$ of Fig. 4.

In the accompanying drawings, the letter $a$ denotes the frame as a whole; $b$, the shafts attached to the front part of the frame; $a'$, a central bar, and $c$ a cross-brace secured rigidly to the central bar at a point some distance from the front end. On the side of the central bar are arranged the laterally-adjustable bars $d\,d'$, that are pivotally connected to the cross-bar at the front end of the frame and are connected by means of the clamping-bolts and nuts $e$ to the cross-brace $c$.

A supporting-wheel $f$ is secured on the underneath side at the front part of the machine, while each of the lengthwise-extending bars of the frame bears a marker-tooth $g$ of peculiar construction. One of these teeth is secured to the rear end of the central bar, while each of the adjustable bars bears a like tooth. The object of the peculiar construction of the frame is to enable these marker-teeth to be placed and held at any desired distance from the central tooth within the limit of the lateral adjustment, that is determined by the length of the slots in the cross-brace. Each of these marker-teeth $g$ is composed of a main part $g'$ and a sliding section $g''$, bolts $h$, extending through the slots $h'$, and nuts $h''$ serving as means for clamping the two parts of the tooth together. Each of these teeth when viewed in plan view is in $\wedge$ shape, a mold-board extending backward and outward from the central line or edge of the tooth, which is curved and slightly turned forward toward the point.

It is often desirable in the use of the implement to change the depth to which the teeth will penetrate the ground, and the object of making the teeth in two parts is to provide for this change of depth of point, while at the same time giving an increased surface of mold-board.

The teeth $g$ are firmly secured to the frame and each is made in sections, so as to be extensible, the clamping device serving to hold the two sections so that the point of the tooth shall penetrate to any depth desired within the limits of the adjustment of the sections upon each other.

I claim as my invention—

1. In combination with the marker-frame having the laterally-adjustable arms and clamping means, the sectional marker-teeth each having a main part and a lengthwise-sliding part held together by means of clamping-bolts, all substantially as described.

2. In combination with the marker-frame having a central bar and the laterally-adjustable side bars each bearing a marker-tooth, the within-described means for clamping said bars, a double mold-board marker-tooth composed of a main part secured to a bar and a lengthwise-sliding part adjustably secured to the main part, and the clamping device for securing the two sections together, all substantially as described.

OZIAS W. GOSLEE.

Witnesses:
CHAS. L. BURDETT,
A. B. JENKINS.